US012603909B2

(12) United States Patent
Herwono et al.

(10) Patent No.: US 12,603,909 B2
(45) Date of Patent: Apr. 14, 2026

(54) NETWORK MONITORING WITH MULTIPLE ATTACK GRAPHS

(71) Applicant: BRITISH TELECOMMUNICATIONS PUBLIC LIMITED COMPANY, London (GB)

(72) Inventors: Ian Herwono, London (GB); Fadi El-Moussa, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 36 days.

(21) Appl. No.: 18/844,143

(22) PCT Filed: Feb. 10, 2023

(86) PCT No.: PCT/EP2023/053346
§ 371 (c)(1),
(2) Date: Sep. 5, 2024

(87) PCT Pub. No.: WO2023/169768
PCT Pub. Date: Sep. 14, 2023

(65) Prior Publication Data
US 2025/0175482 A1 May 29, 2025

(30) Foreign Application Priority Data
Mar. 10, 2022 (GB) ...................................... 2203344

(51) Int. Cl.
H04L 9/40 (2022.01)
(52) U.S. Cl.
CPC ...... H04L 63/1425 (2013.01); H04L 63/1416 (2013.01)
(58) Field of Classification Search
CPC ........................... H04L 63/1416; G06F 21/554
See application file for complete search history.

(56) References Cited

U.S. PATENT DOCUMENTS

2011/0231937 A1* 9/2011 Lippmann ............... H04L 63/20
726/25
2016/0239660 A1* 8/2016 Azvine ............... G06F 16/9027
(Continued)

FOREIGN PATENT DOCUMENTS

EP 2979424 B1 2/2020

OTHER PUBLICATIONS

International Search Report and Written Opinion of the ISA for PCT/EP2023/053346, mailed Apr. 24, 2023, 13 pages.
(Continued)

*Primary Examiner* — Hieu T Hoang
(74) *Attorney, Agent, or Firm* — Nixon & Vanderhye P.C.

(57) ABSTRACT

A computer-implemented method for monitoring a computer network is provided, the method comprising: storing a first attack graph, the attack graph comprising a plurality of nodes each representing an event that may occur within the computer network; storing one or more predetermined variation properties of one or more of the events represented by the nodes, the variation properties being indicative of possible changes to the nodes within the first attack graph; determining a plurality of possible alternative sequences of the nodes in the first attack graph based on the variation properties; generating a plurality of additional attack graphs, each of the additional attack graphs comprising a plurality of the nodes of the first attack graph arranged in one of the possible sequences; and monitoring events within the network to detect a set of events occurring in a sequence that corresponds to one of the additional attack graphs to identify a potential security attack. A computer system including at least one processor and memory storing computer program code configured to perform the said method, and a computer program or computer readable medium comprising instructions that when executed by a computer system cause the
(Continued)

402
storing a first attack graph, the attack graph comprising a plurality of nodes each representing an event that may occur within the computer network 404
storing one or more predetermined variation properties of one or more of the events represented by the nodes, the variation properties being indicative of possible changes to the nodes within the first attack graph;

406
determining a plurality of possible alternative sequences of the nodes in the first attack graph based on the variation properties;

400

408
generating a plurality of additional attack graphs, each of the additional attack graphs comprising a plurality of the nodes of the first attack graph arranged in one of the possible sequences;

410
monitoring events within the network to detect a set of events occurring in a sequence that corresponds to one of the additional attack graphs to identify a potential security attack computer system to perform the said method are also provided.

20 Claims, 5 Drawing Sheets

(56)         References Cited

U.S. PATENT DOCUMENTS

| | | | | |
|---|---|---|---|---|
| 2019/0342307 A1* | 11/2019 | Gamble | ................ | G06F 16/907 |
| 2020/0329055 A1* | 10/2020 | Tyagi | .................. | H04L 63/1441 |
| 2021/0409439 A1* | 12/2021 | Engelberg | ............. | H04L 63/145 |
| 2022/0237303 A1* | 7/2022 | Inokuchi | ............... | G06F 21/577 |
| 2023/0422039 A1* | 12/2023 | Saha | ...................... | G06N 20/20 |

OTHER PUBLICATIONS

Combined Search and Examination Report for GB2203344.3, dated Aug. 1, 2022, 6 pages.
International Preliminary Report on Patentability dated Sep. 19, 2024, issued for International Application No. PCT/EP2023/053346 (8 pages).

\* cited by examiner

402 storing a first attack graph , the attack graph comprising a plurality of nodes each representing an event that may occur within the computer network

404 storing one or more predetermined variation properties  of one or more of the events represented by the nodes, the variation properties being indicative of possible changes to the nodes within the first attack graph ;

406 determining a plurality of possible alternative sequences of the nodes in the first attack graph based on the variation properties;

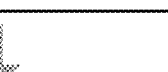

400

408 generating a plurality of additional attack graphs, each of the additional attack graphs comprising a plurality of the nodes of the first attack graph arranged in one of the possible sequences;

410 monitoring events within the network to detect a set of events occurring in a sequence that corresponds to one of the additional attack graphs to identify a potential security attack

FIG. 4

NETWORK MONITORING WITH MULTIPLE ATTACK GRAPHS

CROSS-REFERENCE TO RELATED APPLICATIONS

This application is the U.S. national phase of International Application No. PCT/EP2023/053346 filed Feb. 10, 2023, which designated the U.S. and claims priority to GB 2203344.3 filed Mar. 10, 2022, the entire contents of each of which are hereby incorporated by reference.

FIELD OF THE INVENTION

The present disclosure generally relates to a method and apparatus for monitoring a computer network, particularly for detecting cyber-attack-related activities.

BACKGROUND OF THE INVENTION

Cyber-attacks are typically carried in forms of multi-stage attacks. Such multi-stage attacks are performed in several stages and each of the stages corresponds to one or more distinct types of events occurring within a target computer network. Typically, detection and/or identification of such events and attack stages are performed by monitoring known signatures of malicious traffic and/or activities at various different detectors associated with various different typical stages of a multi-stage cyber-attack.

However, detecting such multi-stage cyber-attacks typically requires linking and examining a plurality of events detected within a target network. For example, although login failures per se are common events which are unlikely to result in a major security incident, if such login failures are followed by a successful login and then installation of malicious software, they are likely to be an indication of a successful cyber-attack.

In view of this, various means for monitoring and linking a plurality of events within a network have been developed. For example, an attack graph displaying suspected cyber-attack-related events within a computer network and sequences of such events can be used to model sequences of steps or activities that an adversary could perform to prepare and launch a cyber-attack. Such attack graphs may be generated based on event logs of a computer network. Modelled sequences of the steps may enable a cyber-defence system to observe relevant network events and look for evidence of potential cyber-attacks, such as ransomware, security breaches and advanced persistent attacks (APTs).

BRIEF SUMMARY OF THE INVENTION

The invention is defined by the claims. Optional features are detailed in the dependent claims.

According to a number of embodiments, the present disclosure relates to a computer-implemented method for monitoring a computer network. The computer-implemented method comprises: storing a first attack graph, the attack graph comprising a plurality of nodes each representing an event that may occur within the computer network; storing one or more predetermined variation properties of one or more of the events represented by the nodes, the variation properties being indicative of possible changes to the nodes within the first attack graph; determining a plurality of possible alternative sequences of the nodes in the first attack graph based on the variation properties; generating a plurality of additional attack graphs, each of the additional attack graphs comprising a plurality of the nodes of the first attack graph arranged in one of the possible sequences; and monitoring events within the network to detect a set of events occurring in a sequence that corresponds to one of the additional attack graphs to identify a potential security attack.

Optionally, the variation properties may include requirements needed for one or more particular events represented by the nodes to occur.

Optionally, the requirements may include one or more prerequisite events that need to occur before the particular events can occur.

Optionally, the variation properties may include optional events that may be omitted or bypassed in a security attack.

Optionally, generating the plurality of additional attack graphs may include omitting one or more of the nodes representing optional events from the additional attack graphs.

Optionally, the first attack graph may be determined by receiving one or more inputs from a user within a user interface.

Optionally, the predetermined variation properties may be determined by receiving one or more inputs from a user within a user interface.

Optionally, at least one of the nodes may specify one or more devices and/or one or more systems at which the events occur or may occur.

Optionally, the device or system at which the events occur or may occur may be specified by using at least one identifier such as an IP address or a MAC address.

Optionally, the device or system at which events occur or may occur may be specified by receiving one or more inputs from a user within a user interface.

Optionally, monitoring events within the network may comprise analysing logs of the network.

Optionally, the logs of the network, the first attack graph, the predetermined variation properties and the additional attack graphs may be stored in a database.

Optionally, the method may further comprise generating an alert upon detecting that a set of events occurs in a sequence that corresponds to one of the additional attack graphs.

According to a number of embodiments, the present disclosure relates to a computer system including at least one processor and memory storing computer program code configured to perform the said method.

According to a number of embodiments, the present disclosure relates to a computer program or computer readable medium comprising instructions that when executed by a computer system cause the computer system to perform the said method.

BRIEF DESCRIPTION OF THE DRAWINGS

The invention will be described in more detail, by way of example, with reference to the accompanying drawings, in which:

FIG. 4 is a flow diagram showing steps for monitoring a computer network, according to an embodiment;

DETAILED DESCRIPTION OF EMBODIMENTS

The embodiments disclosed herein generally relate to a computer implemented method, a computer system, and a computer program for monitoring a computer network. In particular, embodiments will be described in relation to detecting cyber-attack events, but for the avoidance of doubt it should be appreciated that the embodiments may be used for different types of network events in accordance with the teaching herein.

Disclosed herein are various examples related to a method of monitoring a computer network, the method comprising: storing a first attack graph, the attack graph comprising a plurality of nodes each representing an event that may occur within the computer network; storing one or more predetermined variation properties of one or more of the events represented by the nodes, the variation properties being indicative of possible changes to the nodes within the first attack graph; determining a plurality of possible alternative sequences of the nodes in the first attack graph based on the variation properties; generating a plurality of additional attack graphs, each of the additional attack graphs comprising a plurality of the nodes of the first attack graph arranged in one of the possible sequences; and monitoring events within the network to detect a set of events occurring in a sequence that corresponds to one or more of the additional attack graphs to identify a potential security attack.

As used herein, the term "cyber-attacks" cover such activities as denial of service (DOS) attacks, including Distributed Denial of Service (DDOS) attacks, and attempts to infect target computer devices with malicious software. Generally a cyber-attack can be considered as a sequence of events or state transitions culminating in the intruder achieving their goal. As used herein, the term "cyber-defence" means network defence mechanisms including one or more of preventing, detecting, and responding to such "cyber-attacks".

Although embodiments disclosed herein may be discussed with reference to examples relating to cyber-attacks, any suitable principles and advantages discussed herein can be applied to monitoring other types of events within a computer network.

Using graphs or diagrams showing events within a complex computer network in forms of nodes and links can be useful for monitoring current activities and potential future activities of the computer network. Such graphs or diagrams may be generated based on event logs of the computer network. In particular, attack graphs can be used to model sequences of steps or activities that an adversary could take to prepare and launch a cyber-attack. Based on modelled sequences of the steps, a cyber-defence system can observe relevant network events and look for evidence (e.g. from system logs) of potential cyber-attacks, such as ransomware, security breaches and advanced persistent attacks (APTs).

Figure 1:
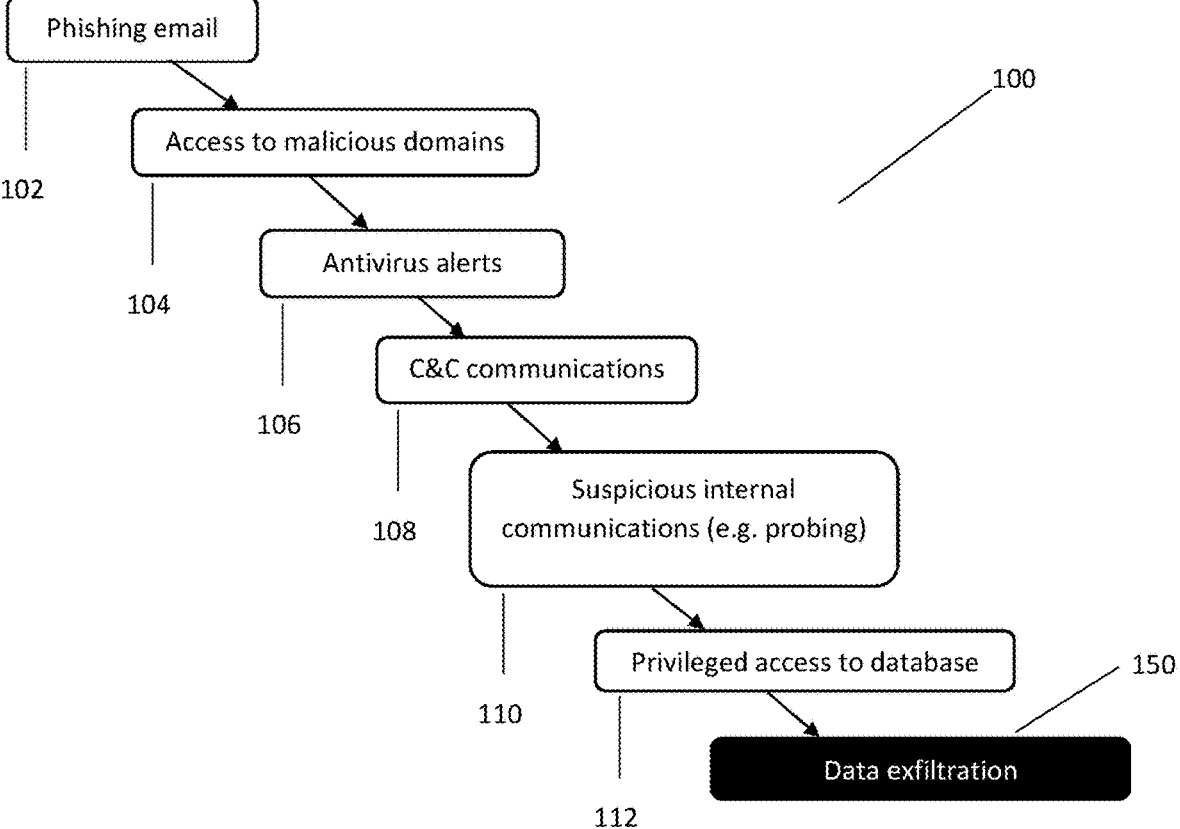
FIG. 1 is an example attack graph comprising a plurality of nodes arranged in a sequence, each node representing an event that may occur within a computer network.

Typically, an attack graph is in a form of an acyclic directed graph, and illustrates a possible cyber kill-chain. As such a cyber kill-chain represents a series of steps of a cyber-attack, from early reconnaissance to achieving objectives of the cyber-attack. An attack graph illustrating a kill chain can provide useful information for understanding and combating the cyber-attack. FIG. 1 shows an example attack graph (100) comprising a plurality of nodes (102, 104, 106, 108, 110, 112, 150) arranged in a sequence. Each of the nodes (102, 104, 106, 108, 110, 112, 150) represents an event that occurs and/or may occur within a computer network during a cyber-attack.

According to the attack graph (110) shown in FIG. 1, the cyber-attack is initiated when a user of the computer network system receives (102) a phishing email. Such a phishing email typically comprises a link or an attachment that can trigger the user to download malware on the user's device.

The downloaded malware may then be executed to cause the user's device to access (104) one or more suspicious or known malicious internet domains. Accessing (104) such internet domains increases the risk of the user's machine being targeted and infected by additional malware that are capable of evading or bypassing a detection.

Consequently, the computer network may observe an increasing number of antivirus alerts (106) originating from the user's device. Some of the malware may be used by an attacker as a backdoor to gain access to the computer network.

In such cases, the computer network may observe suspicious outbound internet traffic originating from the user's device, which may be an indication of communications (108) between the malware and a Command and Control (C&C) server controlled by the attacker.

After the communication between the user's device and the C&C server has been established, the attacker and/or some of the malware installed on the user's device may attempt to search for key assets within the computer network, such as a database, and probe for security vulnerabilities of the computer network. In such cases, the system may observe unusual network traffic and/or communications (110) between the user's device and other network assets (e.g. other devices, systems, or servers) within the computer network.

If the attacker successfully identifies key assets and vulnerabilities of the computer network, the attacker may be able to obtain access to the key assets such as database. In such cases, the network may observe an event of privileged access (112) to the key asset by or via the user's device.

Finally, using the access to the key asset gained via the user's device, the attacker is able to achieve one or more objectives (150) of the cyber-attack, such as data exfiltration. In such cases, the network may observe a large amount of outbound traffic to suspicious Internet domains originating from the user's machine.

The objective (150) of the cyber-attack illustrated in the attack graph (100) in FIG. 1 is data exfiltration. However, in other embodiments the attack graph may illustrate a cyber-attack having a different type of objective, such as such as data destruction or encryption for ransom.

In the example shown in FIG. 1, the events in the kill-chain take place or are expected to take place in a chronological order of: receipt of phishing email (102), access to malicious domains (104), antivirus alerts (106), C&C communication (108), suspicious internal communications (110), privileged access to database (112), and data exfiltration (150). Typically, the sequence of events in an attack graph, such as the graph shown in FIG. 1, is manually specified by a cyber-defence expert based on known tactics, techniques and procedures (TTP) combined with the expert's experience and knowledge about the computer network.

Figure 2:
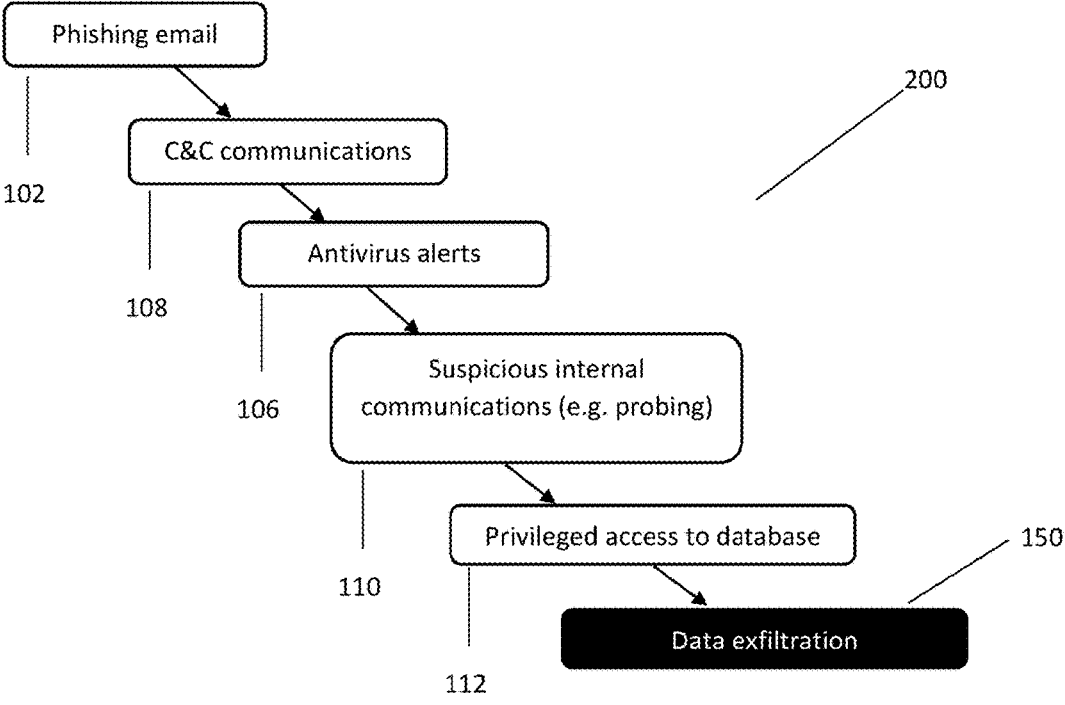
FIG. 2 is an example attack graph comprising a plurality of nodes arranged in an alternative sequence to FIG. 1, each node representing an event that may occur within a computer network, according to an embodiment.

However, a graph that has been manually created by a cyber-defence expert may not be useful if the cyber-attack events can be performed in a different sequence to the one specified, and/or some of the cyber-attack events are not required and can be omitted from the sequence whilst still resulting in a successful cyber-attack that achieves the same goal. As shown in FIG. 2, a cyber-attack having the same objective (150) as that of the cyber-attack illustrated in FIG. 1 may be performed with an alternative sequence of attack events (102, 108, 106, 110, 112, 150).

Optionally, one or more of the attack events (104) may no longer form a part of the cyber-attack. This may be due to the attacker's knowledge about the target computer network. In the alternative attack graph shown in FIG. 2 the event of Access to malicious domains (104) is omitted. This may be because the phishing email already contains the malware to be installed on the user's device as an attachment, which obviates the need for accessing the malicious domains for downloading the malware.

After installing the malware from the email attachment, according to the example of FIG. 2, the malware may initiate communication with a C&C server to download further advanced malware on the user's device. Consequently, this may then trigger antivirus alerts. From there on the sequence of the attack events shown in FIG. 2 follows the same sequence as the original attack graph shown in FIG. 1.

If the number of possible alternative sequences is relatively low, it may be possible to combat cyber-attacks having alternative sequences by manually creating additional graphs to cover all possible alternative sequences of events. However, as the number of possible alternative sequences increases, specifying all possible alternative sequences by relying on manual inputs from a human cyber-defence expert may become increasingly difficult. Furthermore, relying on a human cyber-defence expert to create the additional graphs may be lead to delayed creation of the additional graphs, meaning that some of the attacks may be detected too late.

Figure 3:
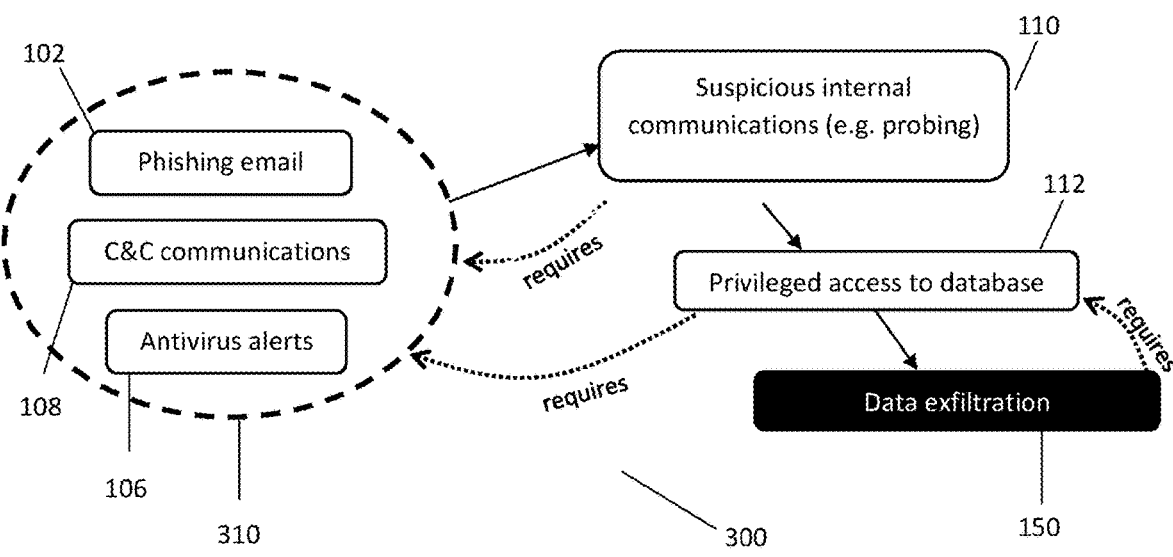
FIG. 3 is an example attack graph comprising a plurality of nodes arranged in another alternative sequence, each node representing an event that may occur within a computer network and some of the nodes forming a part of a node group, according to an embodiment.

As shown in FIG. 1 and FIG. 2, the same attack objective (i.e. data exfiltration) could be achieved by performing the steps in a slightly different order. Furthermore, other alternative attacks containing steps that are not part of an original attack graph or steps/activities that cannot be observed in the network may also be possible. However, the present inventors have appreciated that certain attack steps cannot be performed without having met one or more requirements, such as pre-requisite steps. For example, as illustrated in FIG. 3, an event of suspicious internal communications (110) or privileged access to database (112) is not possible, or is highly unlikely, without previous occurrence of at least one of: receiving phishing email (102), C&C communications (108) and antivirus alerts (106).

Figure 6:
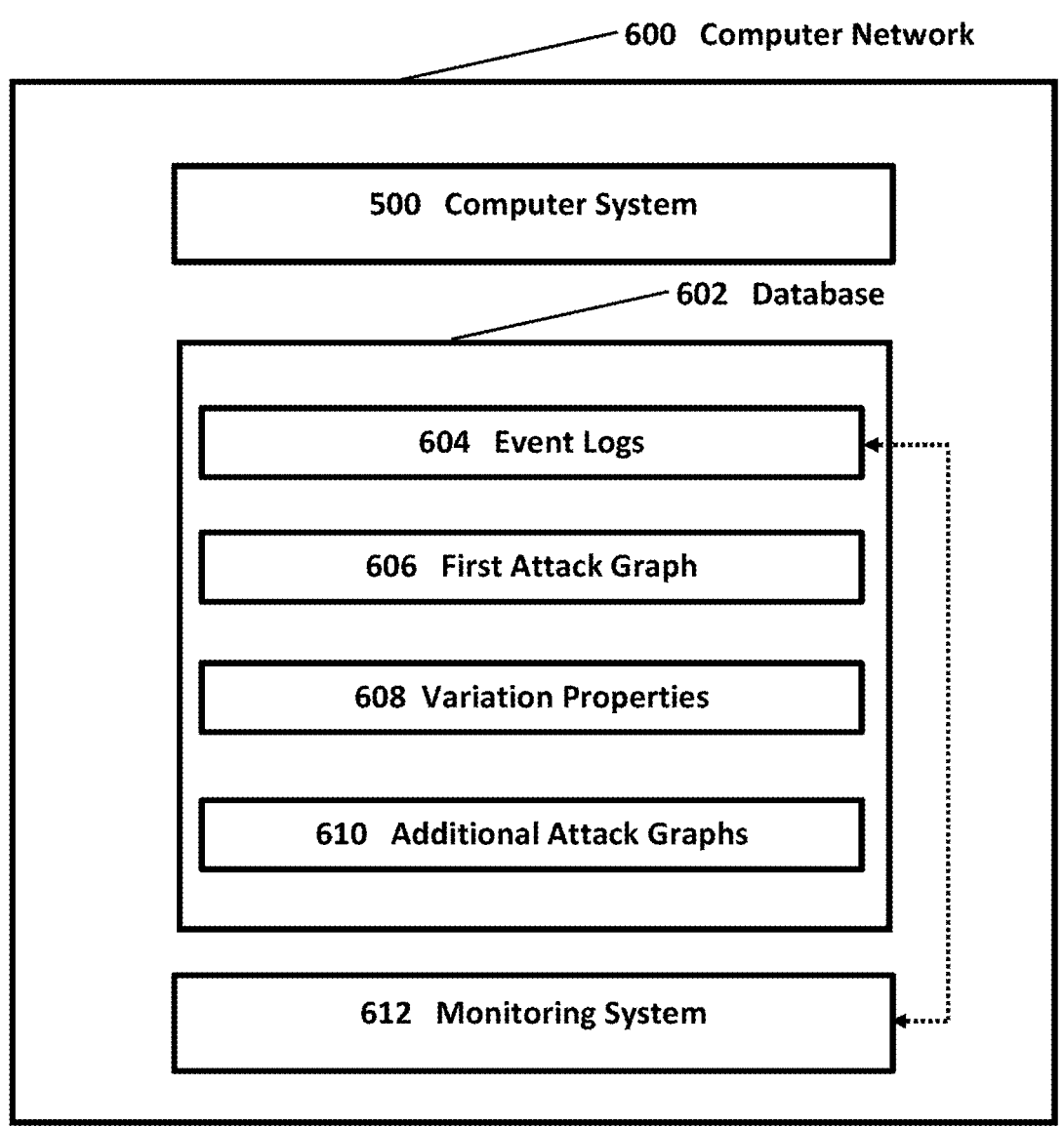
FIG. 6 is a computer network comprising a computer system, database, and monitoring system according to an embodiment.

In view of this, the present inventors have appreciated that it is possible to generate a set of additional attack graphs covering alternative possible sequences of attack events that would each still cause the same security breach or end goal of the intruder, by using a computer-implemented method (400) based on such pre-requisite requirements, as shown in FIG. 4. According to an embodiment, a first attack graph comprising a plurality of nodes is stored (402). The first attack graph may be an attack graph illustrating an original sequence of attack events, such as the attack graph shown in FIG. 1, and each of the nodes represents an event that may occur within the computer network. Optionally, the first attack graph may be determined by receiving one or more inputs from a user via a user interface. Optionally, the first attack graph (606) may be stored in a database (602) which may be located within the computer network (600) as shown in FIG. 6, or may be located remotely from the computer network (600).

In addition, one or more predetermined variation properties of one or more of the events represented by the nodes are also stored (404). The variation properties indicate possible changes to the nodes within the first attack graph. For example, the variation properties may comprise requirements, such as one or more pre-requisite events within the computer network, needed for one or more particular events represented by the nodes to occur. Optionally, the variation properties may also comprise one or more external events from outside the computer network indicating a potential or current attack event. The variation properties may also comprise optional information indicating one or more optional events that may be omitted or bypassed in a security attack. Optionally, the variation properties may be determined by receiving one or more inputs from a user via a user interface. Optionally, the variation properties (608) may be stored in a database (602) which may be located within the computer network (600) as shown in FIG. 6, or remotely from the computer network (600).

The predetermined variation properties may indicate any combination of one or more of the following criteria:
  which attack steps (i.e. which attack graph nodes) are mandatory and therefore must be included in any alternative attack graph;
  which attack steps are optional and therefore can be bypassed or omitted in any alternative attack graph;
  which attack step is a pre-requisite step for another attack step, such that their chronological sequence must therefore be respected in any alternative attack graph; and
  which attack steps can be grouped together as a set of pre-requisite steps for another attack step-provided that the grouped attack steps are optional steps only at least one of the attack steps needs to be present in the group.

Regarding the grouping of attack steps into a set of pre-requisite steps an example is where the attack steps "Phishing email", "C&C communications" and "Antivirus alerts" might be grouped together as attack steps that lead to the subsequent steps "Suspicious internal communications" or "Privileged access to database". In this example, and in general application to any embodiment, only one of the attack steps in the group is needed to lead to the subsequent steps. Therefore, the occurrence of one of the events in the group becomes a prerequisite of the following attack steps. In the example of FIG. 3, the attack steps "Phishing email", "C&C communications" and "Antivirus alerts" might be grouped together and become a pre-requisite of "Suspicious internal communications" or "Privileged access to database" (in no particular order).

The computer network would typically comprise a plurality of devices and/or systems. In such cases, at least one of the nodes may optionally specify one or more devices and/or one or more systems at which the events occur or may occur. This may enable dependencies of one or more attack events on their pre-requisite events to be defined more precisely, which can be useful for identifying paths used for the cyber-attack more accurately and also can potentially reduce the number of false security alerts. Optionally, the device or system at which the events occur or may occur may be specified by receiving one or more inputs including information such as one or more of: device names; IP addresses; and MAC addresses. These inputs may be provided from a user via a user interface.

Based on the stored variation properties, a plurality of possible alternative sequences of the nodes in the first attack graph may be determined (406). Determining the possible permutations and/or combinations of alternative sequences may, for example, be performed using at least one processor (502) of at least one computer system (500).

Based on the determined possible alternative sequences, a plurality of additional attack graphs may be generated (408). Each of the additional attack graphs comprises a plurality of the nodes of the first attack graph arranged in one of the possible sequences that are different from that of the first attack graph. Optionally, when generating the plurality of additional attack graphs, one or more of the nodes representing optional events may be omitted from the additional attack graphs. Optionally, the additional attack graphs (610) may be stored in a database (602) which may be located within the computer network (600) as shown in FIG. 6, or remotely from the computer network (600).

The plurality of additional attack graphs may be generated by including nodes that are specified as mandatory and therefore must be included in any alternative attack graph, adding or removing optional nodes, ordering any pre-requisite nodes chronologically earlier in the attack graph than the associated subsequent node and ordering any pre-requisite grouped nodes chronologically earlier in the attack graph than the associated subsequent node. All variations and permutations can be created whilst adhering to the predetermined variation properties.

One way to generate the set of alternative graphs, potentially applicable in any embodiment, is to generate the complete permutations of all the nodes, remove graphs with duplicate nodes and then perform tests with the permutations against the abovementioned predetermined variation properties. Such an example method may, in particular, involve the steps of:

Taking the input from the first attack graph and identify all its graph nodes. The length N of the first attack graph will be the maximum length of any alternative attack graphs.

Creating N number of arrays/lists where each array/list contains all the nodes of the first graph. Hence there will be N number of arrays each of the size N. E.g. for an example graph A→B→C, then there will be 3 arrays/sets of nodes each with the same members: {A,B,C} {A,B,C} {A,B,C}.

Creating a full permutation of the members of these arrays (i.e. linking every combination of the nodes). This can be performed using any appropriate operation, such as determining the Cartesian product. After such an operation there will likely be a large number of attack graphs each of length N.

Removing from the set of alternative graphs any "invalid" attack graphs. Invalid graphs may be removed by comparing alternative graphs in the set against the variation properties (i.e. comparing against one or more of the above described criteria, such as one or more pre-requisite events). Optionally this may be performed in a number of iterations/loops by testing the validity of each variation property/pre-requisite on each generated alternative graph.

Removing from the set of alternative graphs any "invalid" attack graphs. Removing from the set of alternative graphs any "invalid" attack graphs may include removing any attack graph that contains duplicate nodes, i.e.

if the first attack graph is A→B→C→D, then alternative graphs such as A→A→C→D, or A→B→A→D, and so on, can be removed. Additionally or alternatively, removing from the set of alternative graphs any "invalid" attack graphs may include removing any additional attack graphs that fail the pre-requisite test regarding required chronological sequence, where one attack step is a pre-requisite step for another attack step, such that their chronological sequence must therefore be respected in any alternative attack graph (e.g. if D can happen only after C, then a graph D→C→A→B is not valid and can be discarded). This step may also apply in cases where some of the nodes are grouped, e.g. if D can happen only after Group {B, C}, then the graphs D→C→A→B, or D→B→C→A, or D→A→B→C are also not valid. However, graphs B→C→A→D or C→B→D→A may still be valid depending on the tests with other pre-requisites.

Creating new shorter alternative attack graphs by removing the optional nodes from the existing alternative graphs. This may optionally also include removing optional nodes from groups of nodes.

The additional attack graphs, however generated, can be used to monitor (410) events within the network to detect a set of events occurring in a sequence that corresponds to one of the additional attack graphs in order to identify a potential security attack. Such monitoring may involve analysing event logs of the computer network. This monitoring may be performed by a monitoring system such as a computer system programmed for the task. Optionally, the event logs of the computer network may be used for monitoring the events within the network. Event logs are generated by a computer network according to standard techniques. These event logs (604) may be stored in a database (602), or any other suitable format, which may be located within the computer network (600) as shown in FIG. 6, or remotely from the computer network (600). Furthermore, two or more of the event logs (604) of the network (600), the first attack graph (606), the predetermined variation properties (608) and the additional attack graphs (610) may be stored in the same database (602) as shown in FIG. 6.

As shown in FIG. 6 the monitoring of event logs (604) may be performed by the monitoring system (612) by accessing the event logs (604) and analysing the event logs to identify the events specified in each attack graph. The logs may be monitored by checking for the existence of predetermined event codes or similar techniques. The monitoring system (612) that performs the monitoring may be located within the network (600) as shown in FIG. 6, or outside the network (600). Although the computer system (500), database (602) and monitoring system (612) are illustrated as separate parts forming the computer network (600) in the example of in FIG. 6, in other embodiments, two or more of the computer system (500), database (602) and monitoring system (612) may be integrated as a one device or a system. Such an integrated device or system may be located within the network (600) or outside the network (600).

The monitoring (410) of events using the additional attack graphs enables detection of any set of events that occurs in a sequence that corresponds to one of the additional attack graphs. Upon detecting such a set of events, an alert may be generated by the monitoring system. The generated alert may be communicated to a human cyber-defence expert to enable the cyber-defence expert to investigate and/or implement a suitable defence measure. Alternatively, the alert may be communicated to one or more devices, systems and/or servers connected to the computer network. In such cases, devices, systems and/or servers may be configured to implement suitable defence measures automatically upon receiving the alert.

Figure 5:
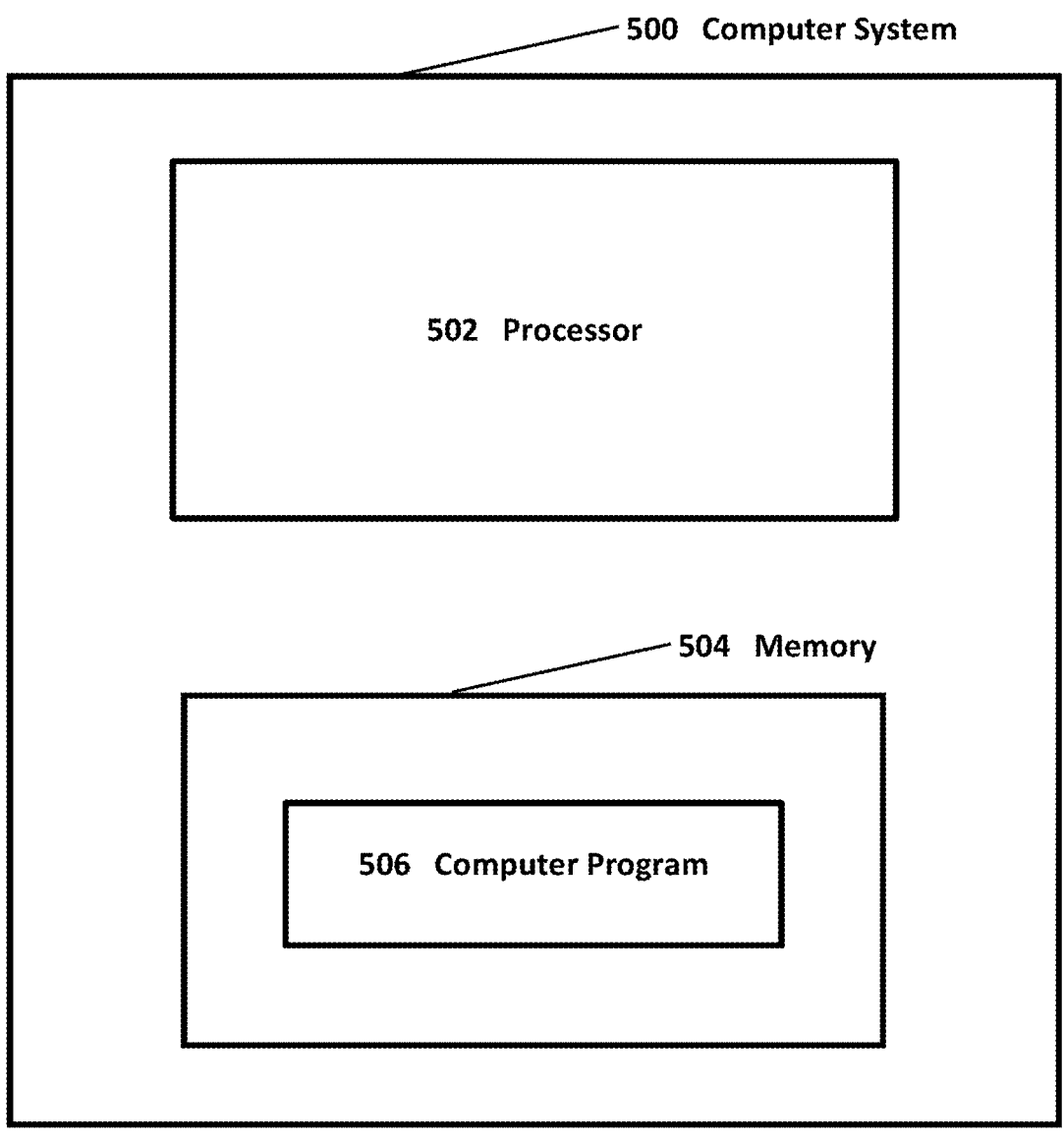
FIG. 5 is a computer system comprising a processor and memory storing computer program configured to perform monitoring of a computer network according to an embodiment.

The computer-implemented method (400) described above may be implemented in a form of computer program (506). The computer program (506), as shown in FIG. 5, may be stored in at least one memory of at least one computer system (500). The computer system (500) may also comprise at least one processor configured to perform the computer program (506). Optionally, the computer system (500) may be connected to and/or form a part of the computer network for which monitoring is being performed.

Embodiments of the invention have been described. It will be appreciated that variations and modifications may be made to the described embodiments within the scope of the present invention.

What is claimed is:

1. A computer implemented method for monitoring a computer network, the method comprising:

storing a first attack graph, the attack graph comprising a plurality of nodes each representing an event that may occur within the computer network;

storing one or more predetermined variation properties of one or more of the events represented by the nodes, the variation properties being indicative of possible changes to the nodes within the first attack graph;

determining a plurality of possible alternative sequences of the nodes in the first attack graph based on the variation properties;

generating a plurality of additional attack graphs, each of the additional attack graphs comprising a plurality of the nodes of the first attack graph arranged in one of the possible sequences; and monitoring events within the network to detect a set of events occurring in a sequence that corresponds to one of the additional attack graphs to identify a potential security attack.

2. The method of claim 1 wherein the variation properties include requirements needed for one or more particular events represented by the nodes to occur.

3. The method of claim 2 wherein the requirements include one or more prerequisite events that need to occur before the particular events can occur.

4. The method of claim 1, wherein the variation properties include optional events that may be omitted or bypassed in a security attack.

5. The method of claim 4, wherein generating the plurality of additional attack graphs includes omitting one or more of the nodes representing optional events from the additional attack graphs.

6. The method of claim 1, wherein the first attack graph is determined by receiving one or more inputs from a user within a user interface.

7. The method of claim 1, wherein the predetermined variation properties are determined by receiving one or more inputs from a user within a user interface.

8. The method of claim 1, wherein at least one of the nodes specifies one or more devices and/or one or more systems at which the events occur or may occur.

9. The method of claim 8 wherein the device or system at which the events occur or may occur is specified by using at least one identifier such as an IP address or a MAC address.

10. The method of claim 8, wherein the device or system at which events occur or may occur is specified by receiving one or more inputs from a user within a user interface.

11. The method of claim 1, wherein monitoring events within the network comprises analysing logs of the network.

12. The method of claim 1, wherein the logs of the network, the first attack graph, the predetermined variation properties and the additional attack graphs are stored in a database.

13. The method of claim 1, further comprising generating an alert upon detecting that a set of events occurs in a sequence that corresponds to one of the additional attack graphs.

14. A computer system for monitoring a computer network, the computer system comprising at least one processor and memory storing computer program code which is executable by the at least one processor such that computer system is configured to:

store a first attack graph, the attack graph comprising a plurality of nodes each representing an event that may occur within the computer network;

store one or more predetermined variation properties of one or more of the events represented by the nodes, the variation properties being indicative of possible changes to the nodes within the first attack graph;

determine a plurality of possible alternative sequences of the nodes in the first attack graph based on the variation properties;

generate a plurality of additional attack graphs, each of the additional attack graphs comprising a plurality of the nodes of the first attack graph arranged in one of the possible sequences; and monitor events within the network to detect a set of events occurring in a sequence that corresponds to one of the additional attack graphs to identify a potential security attack.

15. The computer system of claim 14 wherein:

the variation properties include requirements needed for one or more particular events represented by the nodes to occur; and the requirements include one or more prerequisite events that need to occur before the particular events can occur.

16. The computer system of claim 14, wherein:

the variation properties include optional events that may be omitted or bypassed in a security attack; and the generation of the plurality of additional attack graphs includes omission of one or more of the nodes representing optional events from the additional attack graphs.

17. The computer system of claim 14 wherein the predetermined variation properties are determined by receiving one or more inputs from a user within a user interface.

18. The computer system of claim 14 wherein:

at least one of the nodes specifies one or more devices and/or one or more systems at which the events occur or may occur; and the device or system at which the events occur or may occur is specified by using at least one identifier such as an IP address or a MAC address.

19. The computer system of claim 14 wherein:

at least one of the nodes specifies one or more devices and/or one or more systems at which the events occur or may occur; and the device or system at which events occur or may occur is specified by receiving one or more inputs from a user within a user interface.

20. A non-transitory computer-readable storage medium storing a computer program comprising instructions that when executed by a computer system cause the computer system to perform the steps of the method of claim 1.

\* \* \* \* \*